United States Patent
Diekhans et al.

[11] Patent Number: 6,164,406
[45] Date of Patent: Dec. 26, 2000

[54] MULTIPLE-AXLE STEERING SYSTEM FOR AGRICULTURAL HARVESTING MACHINES

[75] Inventors: Norbert Diekhans, Gütersloh; Heinz Pickert, Rietberg, both of Germany

[73] Assignee: Claas KGaA, Harsewinkel, Germany

[21] Appl. No.: 09/060,916

[22] Filed: Apr. 15, 1998

[30] Foreign Application Priority Data

Apr. 18, 1997 [DE] Germany .......................... 197 16 201

[51] Int. Cl.⁷ .................................................... B62D 6/00
[52] U.S. Cl. ...................... 180/410; 180/415; 180/327; 701/41
[58] Field of Search ................... 180/408, 409, 180/410, 415, 446, 326, 327; 701/41

[56] References Cited

U.S. PATENT DOCUMENTS

| | | | |
|---|---|---|---|
| 4,705,135 | 11/1987 | Kawamoto et al. | 180/410 |
| 4,967,859 | 11/1990 | Tomlinson | 180/79.1 |
| 5,217,083 | 6/1993 | Bachhuber et al. | 180/415 |
| 5,238,077 | 8/1993 | Vaughn et al. | 180/415 |
| 5,417,299 | 5/1995 | Pillar et al. | 180/140 |
| 5,479,999 | 1/1996 | Proia | 180/415 |
| 5,508,921 | 4/1996 | Chikuma et al. | 180/410 |
| 5,607,028 | 3/1997 | Braun et al. | 180/24.01 |
| 5,646,845 | 7/1997 | Gudat et al. | 701/41 |
| 5,701,970 | 12/1997 | Arbjerg | 180/441 |
| 5,718,304 | 2/1998 | Lee | 180/415 |
| 5,954,149 | 9/1999 | Williams | 180/417 |

FOREIGN PATENT DOCUMENTS

| | | | |
|---|---|---|---|
| 35 06 048 C2 | 2/1985 | Germany | B62D 6/00 |
| 36 35 120 A1 | 10/1986 | Germany | B62D 49/00 |
| 38 07 100 A1 | 3/1988 | Germany | B62D 6/00 |
| 38 25 280 A1 | 7/1988 | Germany | B60R 16/02 |
| 39 29 994 A1 | 9/1989 | Germany | B62D 6/00 |
| 40 06 149 A1 | 2/1990 | Germany | B62D 6/00 |
| 40 20 568 A1 | 6/1990 | Germany | B62D 6/00 |
| 40 21 104 A1 | 7/1990 | Germany | B62D 7/14 |
| 41 12 582 A1 | 4/1991 | Germany | B60R 16/02 |
| 41 40 124 C1 | 12/1991 | Germany | B62D 6/00 |
| 92 05 781 U1 | 4/1992 | Germany | B62D 6/00 |
| 42 15 630 A1 | 5/1992 | Germany | B62D 6/00 |
| 93 14 133 U1 | 9/1993 | Germany | A01B 69/00 |
| 43 41 636 A1 | 12/1993 | Germany | B62D 6/00 |
| 44 13 413 C1 | 4/1994 | Germany | B62D 6/00 |
| 195 02 073 A1 | 1/1995 | Germany | B62D 7/15 |
| 195 39 088 A1 | 10/1995 | Germany | B62D 1/28 |

OTHER PUBLICATIONS

Moller, Rudolf, Vehicle Steering Systems For Manual and Automatic Operation. Olhydraulik and Pneumatik, vol. 17 No. 8, pp 225–228, 1973.

Primary Examiner—Brian L. Johnson
Assistant Examiner—Avraham H. Lerner
Attorney, Agent, or Firm—Husch & Eppenberger, LLC; Robert E. Muir; Herman F. Rusche

[57] ABSTRACT

A multiple-axle steering system for an agricultural machine with at least one primary-controlled axle and at least one secondary axle, where the latter's steering deflection angle varies along a progressive characteristic curve as a function of the primary-controlled axle's steering deflection angle. The variation in steering deflection angle along the progressive characteristic curve means that the steering deflection angle of the primary-controlled axle in a range around the zero or neutral position initially results in only a slight steering deflection of the secondary axle. As the steering deflection of the primary-controlled axle increases, the steering deflection angle of the secondary axle progressively approaches the steering deflection angle of the primary-controlled axle. When using all-wheel steering, the use of the progressive characteristic curve facilitates smooth steering when driving on the road, where usually minimal steering deflection is performed by the machine operator. Maneuverability is achieved because an increase in the steering deflection of the primary-controlled axle causes a correspondingly greater ratio of steering deflection of the secondary axle. Furthermore the progressive characteristic curve for all the steering modes provides a standard steering strategy for use of all-wheel steering in combination with special types of synchronous steering.

54 Claims, 10 Drawing Sheets

MULTIPLE-AXLE STEERING SYSTEM FOR AGRICULTURAL HARVESTING MACHINES

BACKGROUND OF THE INVENTION

The invention concerns a multiple-axle steering system preferably for agricultural machines, such as harvesters or tractors, having at least one primary-controlled axle and at least one other axle.

Multiple-axle steering systems of the generic kind are used where different applications of agricultural machines make it necessary to adapt the properties of the machine's maneuverability and tracking capability to the environment within which the machine is operating. These increased demands can be met by various types of steering systems described briefly below. The primary-controlled axis of a generic multiple-axle steering system is usually controlled hydrostatically or electrohydraulically.

Many agricultural machines have a front-axle steering system in which only the front wheels are turned, while the rear wheels remain in the straight-ahead position. This type of steering is needed particularly for road driving.

In addition some agricultural machines have a type of steering referred to as all-wheel steering in which the front and rear wheels are turned in opposite directions. All-wheel steering is preferable where movements of the machine are to be performed in a small space. The turning of the front and rear wheels in opposite directions improves maneuverability of the machine and is particularly effective for making small turning circles of the machine.

Another type of steering is synchronous steering in which the front and rear wheels are turned in the same direction. This type of steering is particularly useful on steeply sloping terrain, where a track parallel to the slope must be maintained. The front and rear wheels turning in the same direction preclude slipping of the machine on the slope or an undesired change in direction of the machine. Synchronous steering is also used on terrain where the lowest possible soil loading or low soil compaction is desired. In this case the front and rear wheels of the vehicle are deflected in the same direction through a relatively large angular range—an angular range of 15° is quite normal here. The four or more wheels of the machine produce, due to the large deflection in the same direction, a number of closely adjacent tracks corresponding to the number of wheels, thereby avoiding the problem of increased soil compaction generally caused by the load of the several wheels in one track. Synchronous steering is sometimes called crab steering.

It is easy to imagine that the different types of steering described above impose high demands on the operator of the machine. It is also necessary to consider particular operational aspects which arise when changing between the individual steering modes, and also when using multiple-axle steering at different driving speeds of the machine. Typical all-wheel steering systems are designed so that the steering deflection of the rear wheels corresponds to that of the front wheels in the opposite direction. Depending on the speed of the machine and the steering movement, this can lead to rapid unexpected changes in magnitude of steer and of direction of the machine. This special problem increases the risk of erratic steering, particularly in the case of unskilled machine operators.

It is an object of the present invention to overcome one or more of the problems described above. It is another object to eliminate the disadvantages of generic multiple-axle steering systems described above, particularly with the all-wheel steering mode. Still another object is to provide a multiple-axle steering system in which different types of steering are combined into a common steering system or strategy. It is desirable that the steering strategy minimize the need for special training of the machine operator and the need for special experience in operating machines which utilize multiple axle steering systems. It is also desirable that the steering strategy minimize uncontrolled and unexpected steering deflections.

SUMMARY OF THE INVENTION

In accordance with the present invention, there is provided a multiple-axle steering system preferably for an agricultural machine, such as a harvester or tractor, with at least one primary-controlled axle and at least one secondary axle, where the latter's steering deflection angle varies along a progressive characteristic curve as a function of the primary-controlled axle's steering deflection angle.

The variation in steering deflection angle along a progressive characteristic curve means that the steering deflection angle of the primary-controlled axle in a range around the zero position initially corresponds to only a slight steering deflection of the secondary axle. As the steering deflection of the primary-controlled axle increases, the steering deflection angle of the secondary axle progressively approaches the steering deflection angle of the primary-controlled axle. When using all-wheel steering, the use of a progressive characteristic curve facilitates smooth steering when driving on the road, where usually minimal steering deflection is performed by the machine operator. Maneuverability of the machine can be achieved because the greater steering deflection of the primary-controlled axle causes correspondingly great steering deflection of the secondary axle. Furthermore the progressive characteristic curve for all the above-mentioned steering modes provides a standard steering strategy for the use of all-wheel steering in combination with special types of synchronous steering.

Below it is assumed that the primary-controlled axle is the front axle in the direction of travel of the machine, unless some other definition is expressly chosen. The secondary axle is the rear axle in the direction of travel.

It is particularly advantageous for the pitch of the progressive characteristic curve to vary steadily. Sudden changes in steering behavior, which could trigger uncertainties in the machine operator, are precluded by this characteristic.

Control of the steering deflection angle of the secondary axle is advantageously achieved by an electrohydraulic steering system. The electrohydraulic steering system may include at least one steering regulator unit and a solenoid valve responsible for control of a steering cylinder. Such a construction is inexpensive and can be limited to modest dimensions. The steering regulator unit can store one or more characteristic curves of the steering ratio between the steering deflection angle of the front axle and the steering deflection angle of the rear axle. The steering regulator unit has a signal input which can receive a control signal generated from the steering deflection angle of the front axle by means of a signal generator located directly on the front axle.

Further it is possible to derive a nominal value for the rear axle directly from the steering wheel's angle of rotation.

It is also advantageous to provide the steering regulator of the secondary axle with a separate adjusting device for shifting the origin of its characteristic curve with respect to the steering deflection angle of the primary-controlled axle. The adjusting device operates within at least two ranges of adjustment, the ranges having equal or different magnitudes and stop points, preferably located at the range boundaries. The adjusting device can be designed to utilize one or more potentiometers. The potentiometer offers a combination of several range settings in one device, provided the potentiometer covers the adjusting device's different ranges of adjustment. The first range of adjustment is used around the zero position of the potentiometer for varying the pitch of the characteristic curve. Another range of adjustment serves to shift a progressive basic characteristic curve from the origin of coordinates in a number of different ways. Here there is the possibility of obtaining the form of the basic characteristic curve or varying it.

If the basic characteristic curve is, for example, shifted with its origin along the ordinate of a coordinate system, and the values for left and right steering angles plotted on the ordinate, the rear wheels are deflected by a small angle to right or left, while the straight ahead position of the front wheels is maintained. This serves to compensate for the sideward pull caused by an implement coupled to the machine.

A shift either on the ordinate or along a line which is at an angle to the ordinate, without a change in the shape of the progressive original characteristic curve, results in a restriction of the maximum deflection of the rear wheels in certain circumstances. For this reason another advantageous embodiment of the multiple-axle steering system provides a shift of the characteristic curve in order to retain the maximum deflection of the original characteristic curve.

If so-called downdrift of the machine on a slope is to be compensated by means of the multiple-axle steering system according to the invention, i.e. the slow downward sliding of the machine when the direction of travel is parallel to the pitch of the slope, then by means of the adjusting device a certain angle of offset is preselected at the rear axle. The operator of the machine, to keep to the track parallel to the slope length, manually turns the steering wheel, causing a steering deflection in the same direction and of equal magnitude as rear axle deflection. This so-called crab steering position of the machine's wheels thus results from linking the preselected set value and the steering deflection of the operator.

The so-called crab steering position of the multiple-axle steering system, that is, the parallel orientation of the front and rear wheels, can be accomplished by the adjusting device, by shifting the origin of the characteristic curve along a line running at a specified angle, such as a 45° angle, to the ordinate. With such a crab steering position of all wheels, the rear wheel steering then works symmetrically along the predetermined progressive characteristic curve about this preset crab steering position according to the steering deflection of the front wheels, which is actuated by the machine operator.

An extreme, yet advantageous, type of crab steering position of the machine, as required for low soil loads, depends on the machine parameters and is achieved by pre-selecting a high steering deflection angle via the adjusting device, such as is made possible by expanding the range of the adjusting device with a maximum value of, for example, ±15°. To make the machine easy to control on turns, with this steering mode pre-selected by means of the adjusting device, each adjustment value range of the rear axle's adjusting device is assigned a shift of the progressive characteristic curve for the steering angle ratio between the secondary axle's steering deflection angle and the front axle's steering deflection angle.

It is also advantageous that, as with the secondary axle, the primary-controlled axle is operated by an electrohydraulic steering system which comprises at least one steering regulator unit and an associated solenoid valve, and receives a signal input for a control signal generated by an automatic tracking system. The automatic tracking system serves to steer the machine automatically along a predetermined line, for example along a given row of plants, without the operator having to perform manual steering adjustments.

By using an electrohydraulic steering system on the primary-controlled axle, in addition to the use of an automatic tracking system and/or steering-by-wire system, the working direction of the vehicle can be easily reversed. This is possible because the steering regulator units of the front axle and of the rear axle remain associated with their respective axle in case of a reversal of the working direction of the machine, and the Anew@ front and "new" rear axles are controlled accordingly. The signal inputs of the steering regulator units are wired in such a way that the automatic tracking system and rear axle steering are switched when the working direction of the machine is reversed. The control signal of the automatic tracking system is associated with the signal input of the rear axle's steering regulator unit, which receives the control signal of the front axle steering system, upon reversal of the working direction. Analogously, the control signal for the front axle steering is associated with the signal input of the front axle's steering regulator unit, which receives the control signal for the automatic tracking system upon reversal of the working direction. When reversing the working direction it is necessary to reverse other working elements of the machine, such as the steering wheel position, the operator's seat position or the cab position, that are dependent upon the working direction of the machine. When the working direction is reversed, the driver's cab and/or seat may be rotated 180° in the opposite direction or a reversing device used.

However, for certain harvesting work, such as the mowing of grass, it may be desirable to preclude an automatic change-over of axle control if the working direction, is reversed. Under these circumstances, after the reversal of the working direction the axle which is now the rear axle is primary-controlled by the steering wheel and the other axle which is now the front axle is accordingly controlled as a function of the characteristic curve. The primary-controlled axle is connected by a crossing valve to the orbitrol for this special rear steering variant.

The embodiment of the multiple-axle steering system having a primary-controlled front axle controlled by a steering regulator and a solenoid valve, furthermore makes it possible to eliminate the special problem of linking between synchronous steering mode and all-wheel steering mode. If the machine is provided with the multiple-axle steering system according to the invention, a large angle of adjustment is preselected for the rear axle by means of the adjusting device (crab steering); and if a shift of the progressive characteristic curve has taken place due to this adjustment, then an additional steering deflection by the operator in the same direction the front and rear wheels are already turned as a result of diagonal driving, causes a steering turn of the rear axle in the opposite direction of deflection which in certain circumstances proceeds very rapidly. To prevent or delay this, in the event of a large shift of the origin of the characteristic curve of the rear axle and a high rate of adjustment, a certain quantity of oil at the ORBITROL steering unit is taken from the oil circuit of the orbitrol and the front axle steering cylinder unit by the solenoid valve located on the primary-controlled front axle.

This quantity of oil can be controlled by the steering regulator unit on the front axle in such a way that the sum of the resulting steering angle changes of the front axle and the rear axle remains essentially constant. Even in the event of large shifts of the characteristic curve at the steering wheel, this measure results in a more uniform steering feel without abrupt steering deflections.

It is sometimes advantageous to provide the steering regulator unit of the primary-controlled front axle with a monitoring mode which is operative only during road driving of the machine, and which enables the steering regulator unit to compare the rear axle's steering deflection angle with the front axle's steering deflection angle. If deviations from the nominal value are determined during this comparison by the steering regulator unit of the front axle, this steering regulator unit can generate a control signal for automatic return of the rear axle to the zero position and, if required, locking of the rear axle in this position. Further, if deviations from the nominal value are determined during comparison of the steering deflection angles, the steering regulator unit of the primary-controlled front axle may be arranged to activate an alternative steering strategy. The comparison of the steering deflection of the primary-controlled front axle and of the secondary axle is made in such a way that an additional steering angle generator on the front axle provides the required reference signal. An additional monitoring mode of this kind is advantageous in particular when a redundant steering strategy of the multiple-axle steering system is desirable.

Another advantageous design of the multiple-axle steering system provides for integration of the steering regulator units of the front axle and the rear axle in an electronic steering control system, where the terminals of the individual steering regulator units are reduced.

Furthermore the logic components of the individual steering regulator units can be implemented as separate software tasks. Similarly the logic components of the steering regulator units can be constructed on common microprocessor hardware. As an extra monitoring function it is advantageous to provide the electronic steering control system, which includes the steering regulators of the front axle and the rear axle, with an extra microprocessor which, as a microcontroller, monitors the signal inputs and outputs of the steering regulator units. Should the microprocessor detect a malfunction of one of the steering regulator units, then the microprocessor can take over the function of the faulty steering regulator unit.

BRIEF DESCRIPTION OF THE DRAWINGS

Below, the multiple-axle steering system according to a preferred embodiment of the invention and the associated particular embodiments are described in detail with the aid of the drawings.

DETAILED DESCRIPTION

Figure 1:
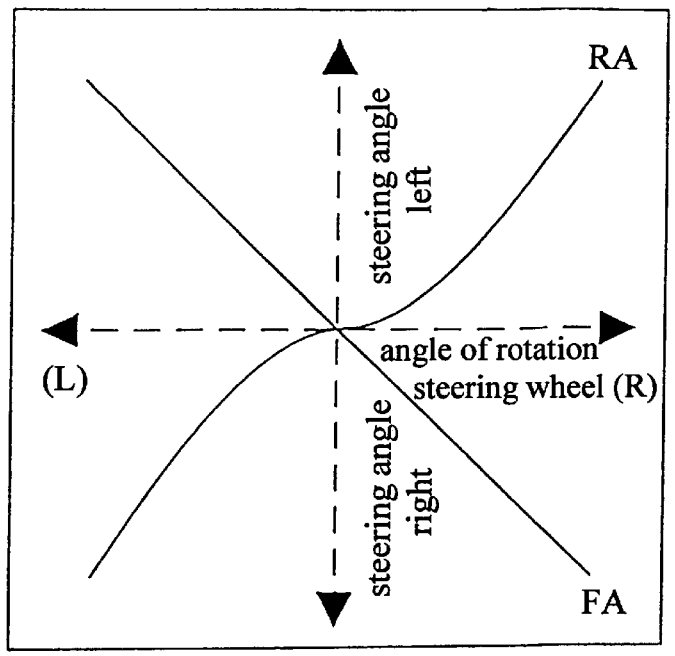
FIG. 1 is a diagram for the dependence of the steering deflection angle of a rear axle in the direction of travel, and of the steering deflection angle of the front axle in the direction of travel, on the angle of rotation of the steering wheel, plotting the basic characteristic curve RA with progressive path.

FIG. 1 shows a coordinate system in which the angle of rotation of the steering wheel right to left is plotted on the horizontal axis and the steering deflection of the wheels right to left is plotted on the vertical axis. A linear characteristic curve with reference FA, which provides direct proportionality between the angle of rotation at the steering wheel and the steering angle deflection at the primary-controlled front axle, is plotted in the coordinate system. Furthermore FIG. 1 shows an exemplary progressive characteristic curve RA for the steering angle deflection of the secondary axle. Front and rear axles are in the all-wheel steering mode where the front and rear wheels are turned in opposite directions. It can be seen from characteristic curve RA that no steering deflections, or only very slight steering deflections, of the secondary axle coincide with small deflections of the angle of rotation at the steering wheel about the zero position. Greater deflections of the angle of rotation at the steering wheel then lead, according to the progressive characteristic curve shown in FIG. 1, to a greater steering deflection of the secondary axle until, at the maximum angle of rotation of the steering wheel, the front axle and the rear axle steering deflections are equal, although in opposite directions. A progressive characteristic curve of this kind for rear axle steering movement shown in FIG. 1 has the advantage that, when travelling at higher speeds on the road or on cross-country terrain, the resulting low steering deflection results in sufficiently smooth driving. Furthermore, the characteristic curve shown in FIG. 1 is a smooth curve, avoiding irregularities and abrupt changes of steering angle by this means.

In addition to the general progressive characteristic curve shown in FIG. 1, accomplishing other steering modes or obtaining an optimum steering strategy for all circumstances, is possible by shifting the original characteristic curve out of the origin of coordinates and/or varying it in its pitch by means of one or more adjusting devices, preferably in the form of potentiometers hereinafter described.

Figure 2:
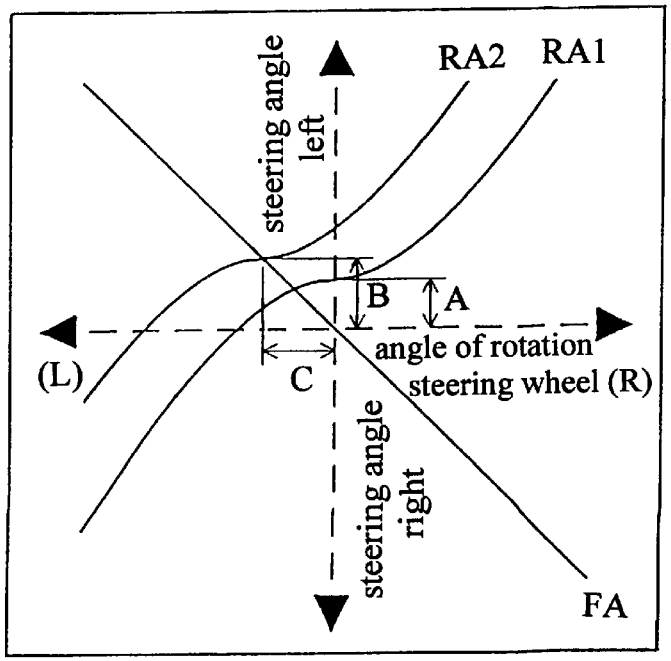
FIG. 2 is a diagram with various kinds of shifts of the progressive basic characteristic curve, without variation in the curve shape.

In FIG. 2 a shift of the original characteristic curve RA from FIG. 1 along the ordinate axle is plotted. The shifted characteristic curve bears the reference RA 1 and is shifted upwards from the zero point by the amount A. The shift of the characteristic curve means in practice that in the neutral position (straight-ahead position) of the front wheels, a slight angular adjustment of the rear wheels has taken place according to the amount A, that is, the rear wheels are turned slightly to the left. A slight angular offset of the rear wheels of this kind can be necessary for example when coupling of an implement causes a sideward pull and acting on the towing machine is to be compensated.

In FIG. 2 is also plotted a shift of the original characteristic curve RA from FIG. 1 along a line which is inclined at 45 degrees to the ordinate and corresponds to the front axle characteristic curve FA. The shift is comprised of a shift portion B as well as a shift portion C of equal magnitude. A shift of the original characteristic curve RA of this kind represents in practice the accomplishment of the "crab steering" mode. The front and rear wheels are in this case turned by a given amount in the same direction. Starting from this crab steering basic setting, deflection of the rear wheels then occurs according to the original characteristic curve RA symmetrically about the preselected crab steering setting. The crab steering mode may be used, for example, when parallel driving along a steep slope.

Figure 3:
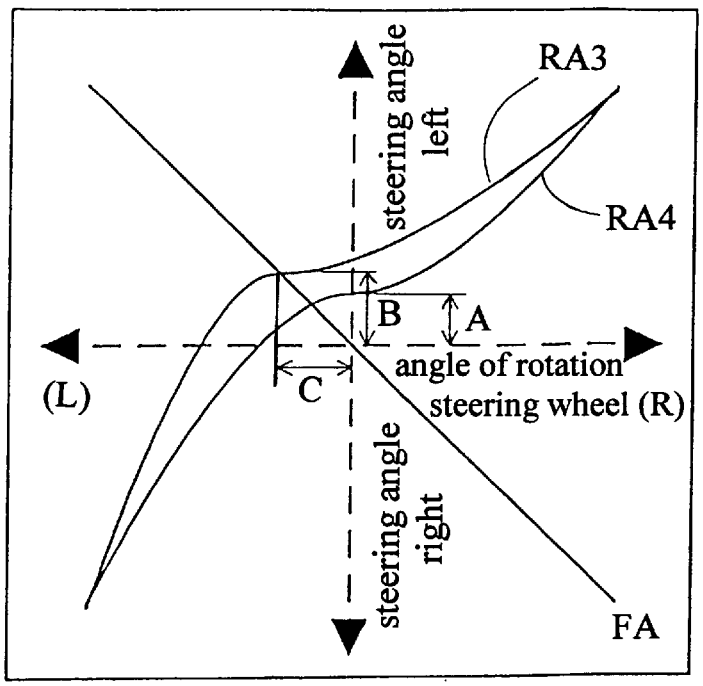
FIG. 3 is a diagram with the shifted progressive basic characteristic curves according to FIG. 2, retaining the end points of the basic characteristic curve.

It can be seen from FIG. 2 that due to the shift of the original characteristic curve toward the characteristic curve RA 2, when there is high steering deflection of the front wheels, the entire steering angle range of the rear wheels is somewhat restricted. To ensure greater if not full maneuverability of the machine, it is advantageous to maintain the end stops of the original characteristic curve RA. For clarification, in FIG. 3 is plotted, the shift of the original characteristic curve RA along the ordinate by the amount A, as also shown in FIG. 2. The end regions of the characteristic curve, clearly differ from the view in FIG. 2, as the end stops of the rear wheels of the characteristic curves RA 3 or RA 4 plotted in FIG. 3 correspond to those of the original characteristic curve RA from FIG. 1.

If the characteristic curve RA 3 from FIG. 3 is further shifted along the diagonal according to FA, in extreme cases there is a considerable change in shape of the characteristic curve due to the fact that the end stops of the original characteristic curve are maintained. The shape of the characteristic curve RA 5 from FIG. 4 means that an extreme crab steering position with a preselected angle of adjustment of, for example, 15 degrees has been set.

It can be seen from the characteristic curve RA 5 that at the point of intersection of the characteristic curves FA and the curve RA 5 there is a high deflection in the same direction of rear wheels and front wheels to the left. A further slight deflection of the steering wheel to the left leads, according to the characteristic curve RA 5, to a drastic steering deflection of the rear axle. For this reason the hydrostatic multiple-axle steering system in another embodiment is designed in such a way that where there is high deflection in the same direction of the front and rear wheels (crab steering), a further steering wheel deflection in the direction already taken by the front axle and rear axles automatically causes the solenoid valve 18 mounted on the front axle to release or scavenge a certain quantity of oil from the oil circuit, which is responsible for control of the front axle and which is formed by ORBITROL steering units 1 and steering cylinder 2. This causes the machine operator to move the front wheels with an altered steering ratio. This is shown by the bending characteristic curve FA at the top left in FIG. 4. It is believed evident that a so-called extension of the angle of rotation D is now available for the rear axle. The steering deflection of the rear wheels therefore occurs according to characteristic curve RA 5 within an extended angle of rotation of the steering wheel. Such a change in the extreme position of the synchronous steering enhances the safety of the whole steering design, since a uniform steering feel is maintained even within the range of considerable steering wheel movements.

Figure 5:
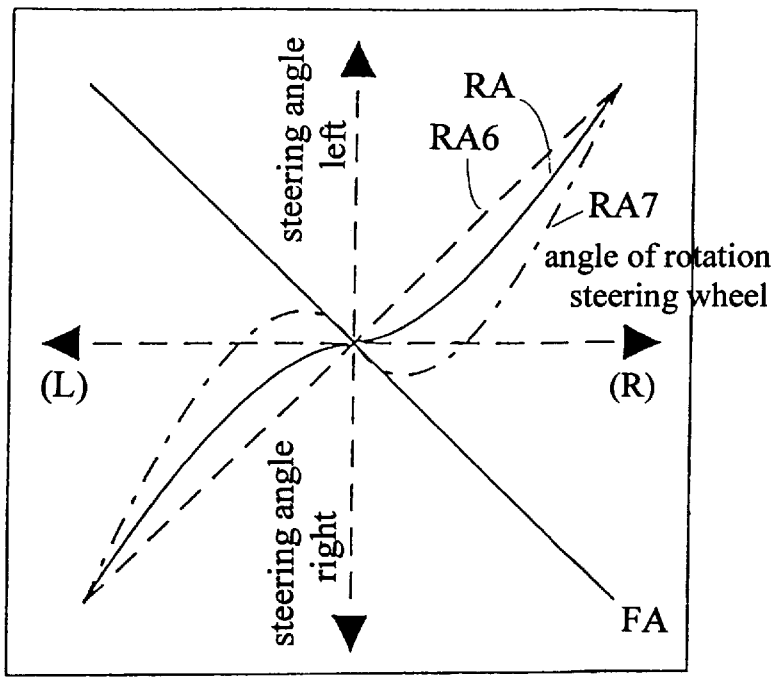
FIG. 5 is a diagram in which progressive basic characteristic curves with different pitch in the coordinate origin are plotted.
Figure 6:
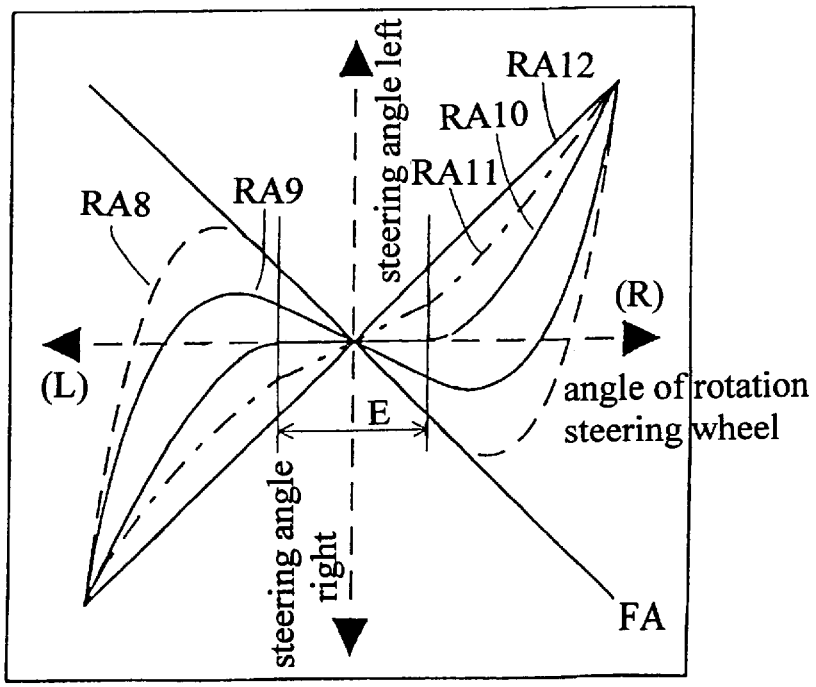
FIG. 6 is a diagram in which a plurality of characteristic curves with linear portions of different pitch are plotted.

FIGS. 5 and 6 show other possible ways of varying or changing the progressive characteristic curve where the pitch is varied in the coordinate origin. The end stops of the original characteristic curve RA from FIG. 1 are also maintained in the modified characteristic curves of FIGS. 5 and 6. The modified characteristic curves RA 6 and RA 7 shown in FIG. 5 are designed in such a way that the pitch values are fixed at the origin and the shape of the characteristic curves is adapted accordingly. Starting from a pitch of zero of the original characteristic curve RA existing at the origin, the characteristic curve RA 6 has a pitch of +1, that is, the rear wheels are turned opposite the direction of rotation of the front wheels, with the same steering angle. A rear axle characteristic curve of this kind with a pitch of +1 is yielded by all-wheel steering with one hundred percent synchronicity.

A characteristic curve RA 7, also shown in FIG. 5, has a pitch of −1 at the origin, corresponding to the front axle characteristic curve FA. This means that the rear wheels follow in the same direction as the steering deflection of the front wheels in the region around the zero point, corresponding to the crab steering, which is necessary when driving parallel to a steep slope. If the slope changes, the crab steering can be compensated by simply turning the steering wheel. Should a sideward pull arise at one axle, this can be eliminated by a simple correction of the characteristic curve pitch. In case of large front wheel steering angles, such as are needed, for example on a forward turn, the rear axle wheels pivot with the increasing steering angle of the front wheels into the all-wheel steering mode, as can also be seen from the characteristic curve RA 7 of FIG. 5.

The characteristic curves shown are within a usable range only at pitches of −1 to +1. In this range any type of combined steering between crab steering and all-wheel steering can be preselected by the pitch adjusting device. Furthermore, special settings outside the above pitch range, with which a lateral force can be compensated, are contemplated.

In FIG. 6, characteristic curves RA 8 to RA 12 are plotted with, by contrast with the illustration of the characteristic curves in FIG. 5, a range E which is variable by a potentiometer if necessary. Furthermore, in FIG. 6, the pitch of the characteristic curves remains constant.

Figure 7:
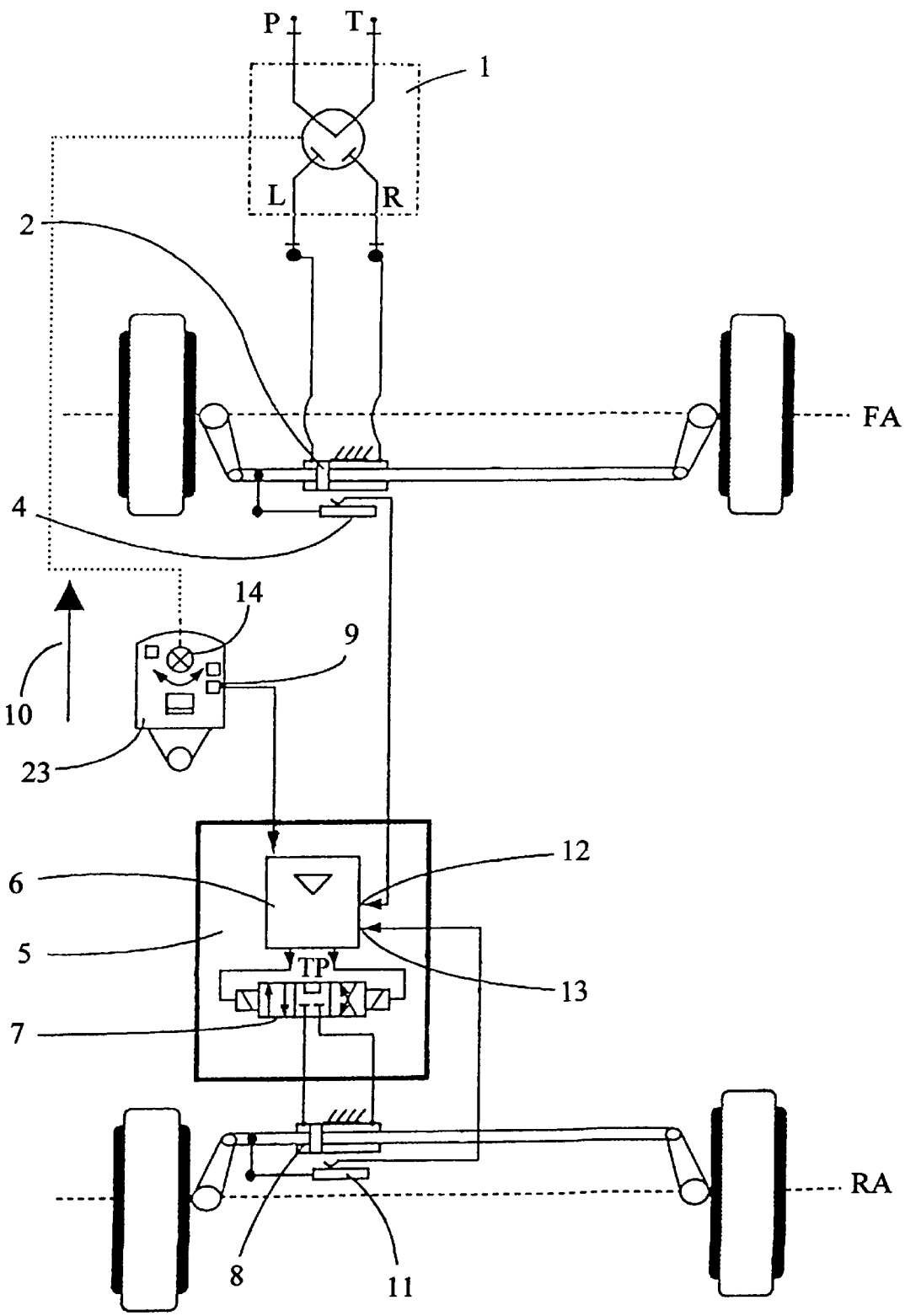
FIG. 7 is a schematic basic view of a simple construction of a multiple-axle steering system embodying the invention.

FIG. 7 shows an embodiment of the hydrostatic multiple-axle steering system in a two-axle machine having a front axle FA and rear axle RA. The working direction of the machine is illustrated by the arrow 10. The hydrostatic multiple-axle steering system provides an ORBITROL 1 as well as a steering cylinder 2 for direct control of the front axle. A measurement transducer 4 is located on the front axle FA to sense the steering deflection angle $SA_F$ at the front axle FA. The rear axle RA of the machine is assigned an electrohydraulic steering system generally designated 5 and shown as a rectangle in FIG. 7. The electrohydraulic steering system 5 includes several components which are shown schematically within the rectangle. Essentially the components are a steering regulator unit $SRU_R$ 6 and a solenoid valve $SV_R$ 7 for controlling a steering cylinder 8 located directly on the rear axle. Similar to the front axle FA, the rear axle RA has a measurement transducer 11 which converts the steering deflection angle $SA_R$ of the rear axle RA to an electrical control signal which is received by one signal input 13 of the steering regulator unit $SRU_R$ 6. An additional signal input 12 of the steering regulator unit $SRU_R$ 6 is connected to the measurement transducer 4 of the front axle FA. Within the steering regulator unit $SRU_R$ 6 is stored at least one of the progressive characteristic curves RA for the rear axle deflection plotted by way of example in s 1–6 as a function of the front axle deflection. Rotation of the steering wheel 14, shown schematically in a driver's cab 23, causes via the ORBITROL 1 the deflection of the front axle. The deflection is, as a rule, not absolutely proportional to the steering wheel rotation, but is shown as thus in simplified form. The steering deflection angle $SA_F$ is converted by the measurement transducer 4 to a control signal and fed via the signal input 12 to the steering regulator $SRU_R$ 6. The steering regulator $SRU_R$ 6 then controls, according to the above characteristic curve, the steering deflection angle $SA_R$ of the rear axle RA. The measurement transducer 11 makes it possible to monitor the steering angle $SA_R$ as far as the nominal value required by the characteristic curve.

Figure 4:
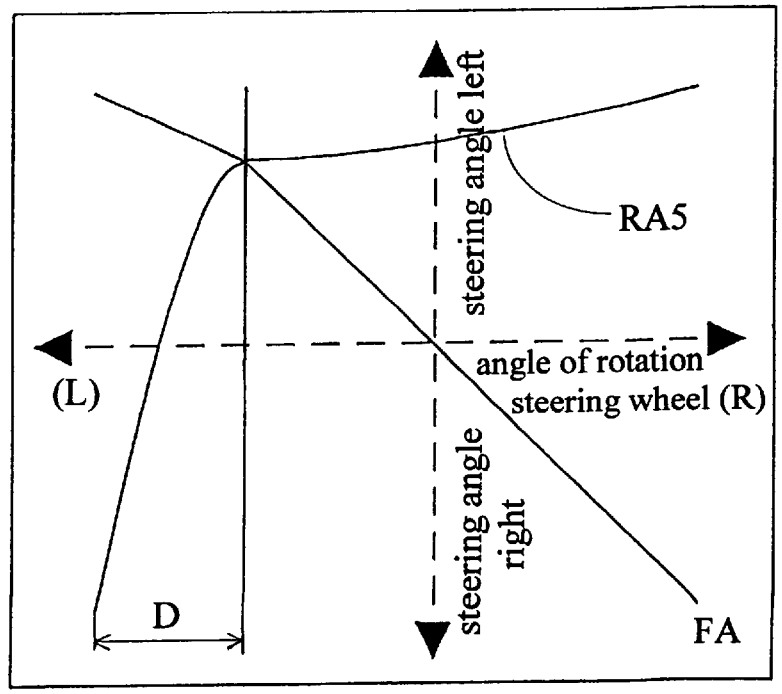
FIG. 4 is a diagram with a greatly shifted progressive characteristic curve.
Figure 8:
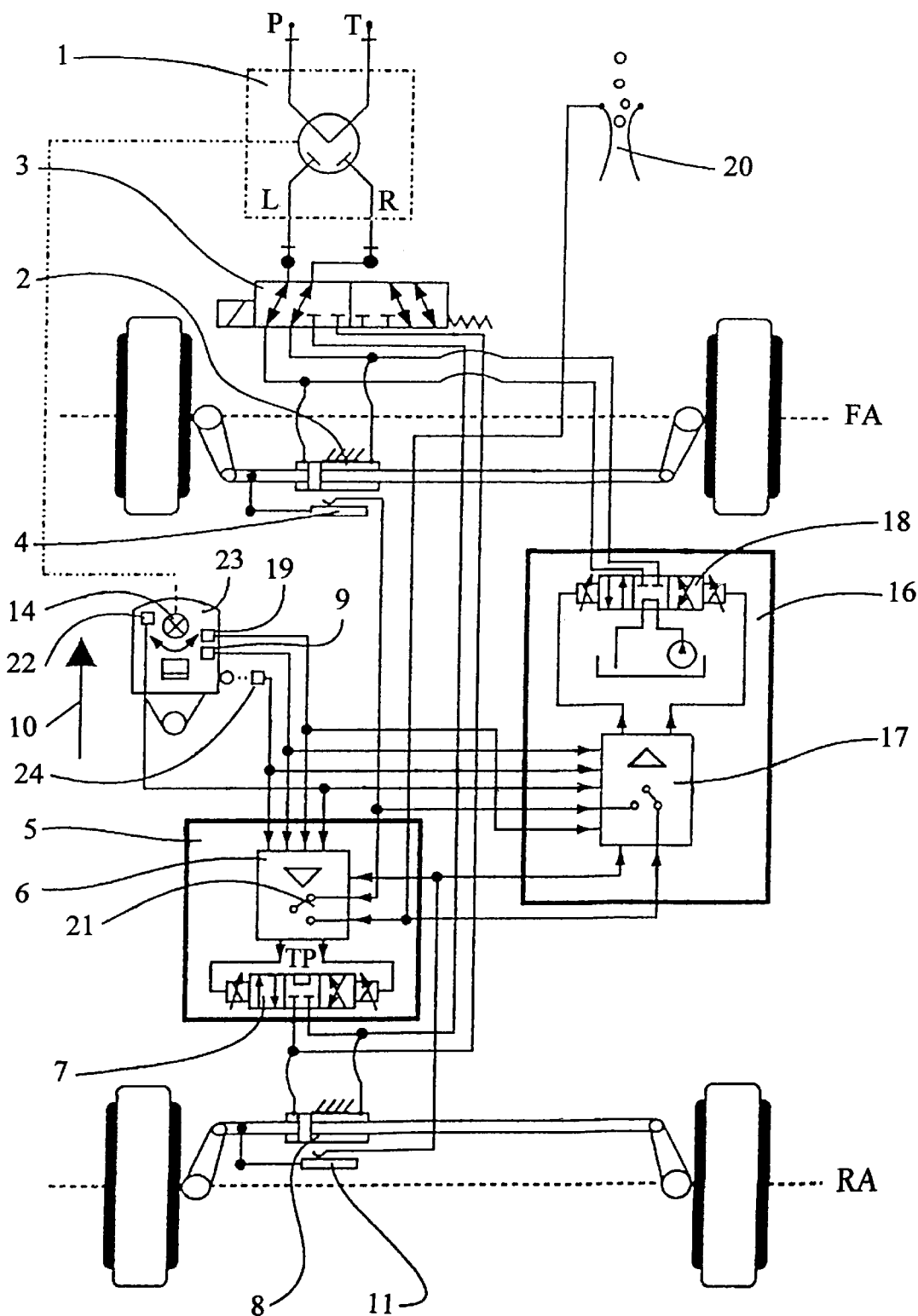
FIG. 8 is a schematic view of a more detailed construction of the multiple-axle steering system shown in FIG. 7.
Figure 9:
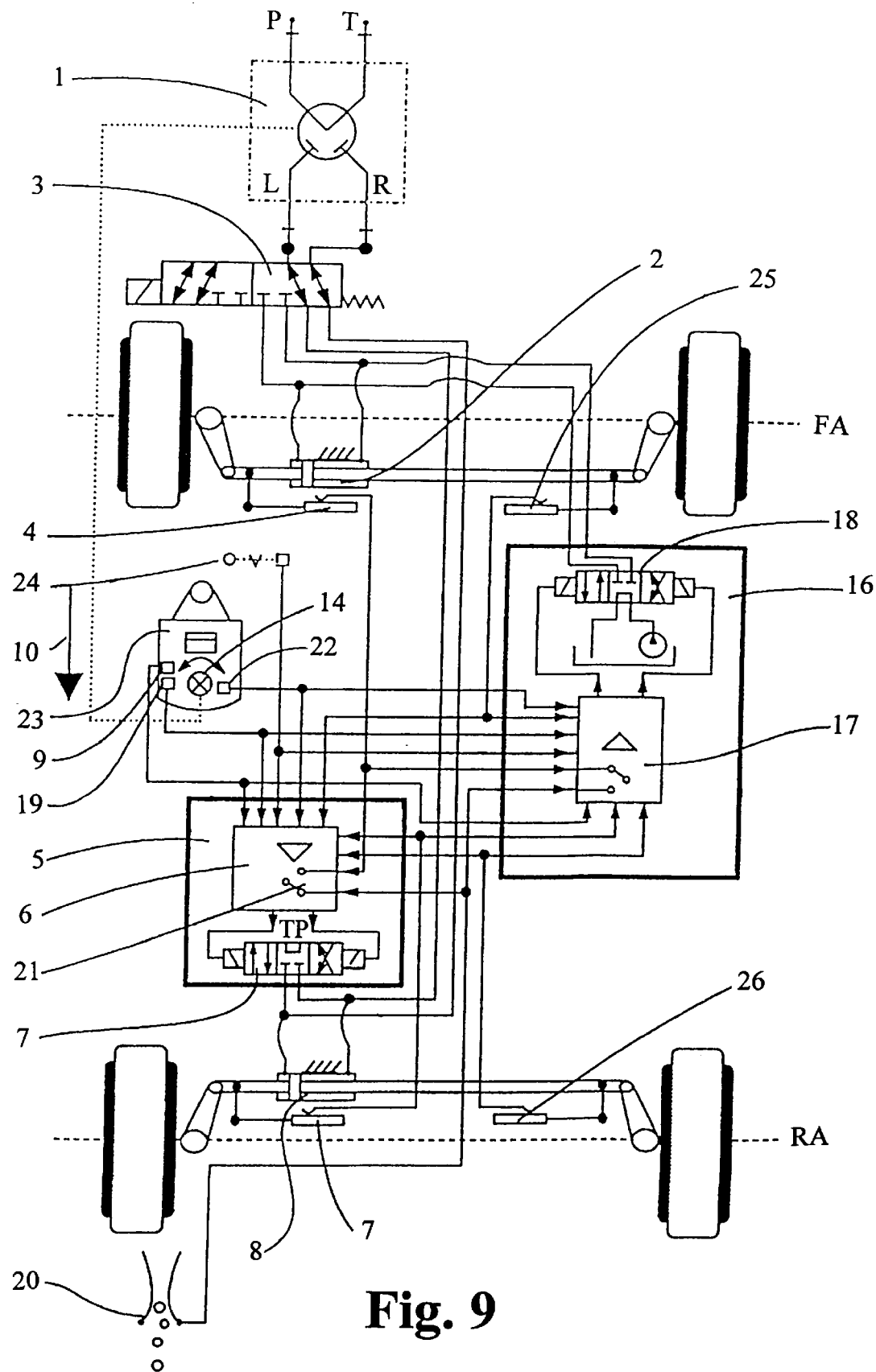
FIG. 9 is a schematic view of the multiple-axle steering system as in FIG. 8 but with the working direction of the machine reversed.

FIG. 8 shows a special embodiment of the hydrostatic multiple-axle steering system which makes it easy to produce an extension of the angle of rotation according to FIG. 4. In the FIG. 8 example, as in FIG. 7, an electrohydraulic steering system 16 is mounted on the front axle FA. This steering system 16 contains, similar to the rear axle, a steering regulator unit $SRU_F$ 17 as well as a solenoid valve $SV_F$ 18. The ORBITROL 1 is connected to the steering cylinder 2 by the steering logic valve 3. Additional components are shown schematically in FIG. 8 for clarification. For example, an autopilot transducer 20, which delivers an electrical control signal both to the steering regulator unit $SRU_F$ 17 on the front axle FA and to the steering regulator unit $SRU_R$ 6 on the rear axle RA, is mounted at the front of the machine. The signal of the autopilot transducer 20, however, is not used in the steering regulator unit $SRU_R$ 6, which is shown by switch 21 in the steering regulator unit $SRU_R$ 6. The autopilot transducer 20 can be switched on and off by a button 22 in the driver's cab 23. The corresponding switching signal for switching the autopilot 20 on and off is also an input signal transmitted to both steering regulator units 6 and 17. Due to the special design of steering regulator units $SRU_R$ 17 and $SRU_F$ 6 on the front and rear axles and the solenoid valves $SV_R$ 7 and $SV_F$ 18 and because the steering regulator characteristic curves are controlled in accordance with the reversal of the front axle FA and the rear axle RA, it is now possible to carry out a reversal of the working direction of the machine as is shown in FIG. 9. The driver's cab 23 of the vehicle is arranged to be pivoted 180° as a whole unit, so that the driver's cab 23 with the steering wheel 14 now points in the new working direction, shown by the arrow 10. The new position of the driver's cab 23 is signalled to the steering regulator units $SRU_R$ 6 and $SRU_F$ 17 by a cab position scanner 24. The autopilot scanner 20 is now on the front side which is opposite the front side according to FIG. 8. The switch 21 in the steering regulator unit $SRU_R$ 6 of what is now the front axle was brought into the position shown in FIG. 9 by reversal of the working direction. Therefore, in contrast with the view of FIG. 8, the autopilot signal occurring at the steering regulator can now be used in the steering regulator unit $SRU_R$ 6, depending on whether the operator has switched on the autopilot. The signal inputs of the steering regulator units $SRU_R$ 6 and $SRU_F$ 17 are controlled in exchange according to the reversal of the working direction. Thus, the signal input of the steering regulator unit $SRU_R$ 6, which the control signal of the front axle was originally transmitted to, now receives the control signal for automatic tracking (autopilot), while the steering regulator unit $SRU_F$ 17 receives the control signal for the front axle steering by a progressive characteristic curve. Due to this switching of the signal inputs, the whole multiple-axle steering system can be used without problems in the reverse working direction according to the steering strategies described above. The machine provided with the multiple-axle steering system is thus fully capable of being used universally in both directions of travel. All switchovers at the steering regulator units can be performed automatically upon reversal of the working direction without the operator having to manually adjust individual components of the multiple-axle steering system.

To further improve the multiple-axle steering system, there can be provided an additional monitoring mode which is integrated in at least one of the steering regulator units 6 or 17 and which is operative during road travel of the machine. In this monitoring mode, the steering regulator unit 6 or 17, by means of a transfer function, compares the steering deflection angle of the rear axle with the steering deflection angle of the front axle. The steering angles can then be measured with additional measurement transducers 25 and 26, mounted on the axles. The measurement transducers are shown in FIG. 9. The measurement transducers 25 and 26, like the measurement transducers 4 and 11 already mentioned above, convert the steering deflection at the front and rear axle to control signals which are transmitted to the steering -regulator unit 6 or 17. Here it should be taken into consideration that due to the geometry of the steering trapezia of the wheels, the steering angles on the right and the left can be different. If the signal values of the measurement transducers 25 and 26 are different, such difference is taken into consideration by an adapted characteristic curve. The benefit of monitoring the steering strategy is that during road driving an autopilot function is unnecessary. The corresponding steering regulator unit for autopilot control is thus functionless during road driving and can assume the monitoring function within the framework of a redundant safety circuit. Since one or more of the relevant progressive characteristic curves for controlling the rear axle are stored in the steering regulator, a malfunction of the steering regulator operating at the rear axle can be detected. Thus, it is possible for the steering regulator unit to generate a control signal for automatic return of the rear axle to the neutral position and, if necessary, locking of the rear axle in this position. Furthermore it is also an advantage to convey an appropriate warning message to the operator and, if necessary, automatically switch on an emergency running function of the steering system.

Naturally it is also conceivable to have the hydrostatic multiple-axle steering system according to the principles of the invention with only one steering regulator unit SRU, yet still carry out switching of the working direction. In this case, the wheel angle transmitters, the ORBITROL 1 and the remaining connections of the rear axle and front axle can be exchanged.

Figure 10:
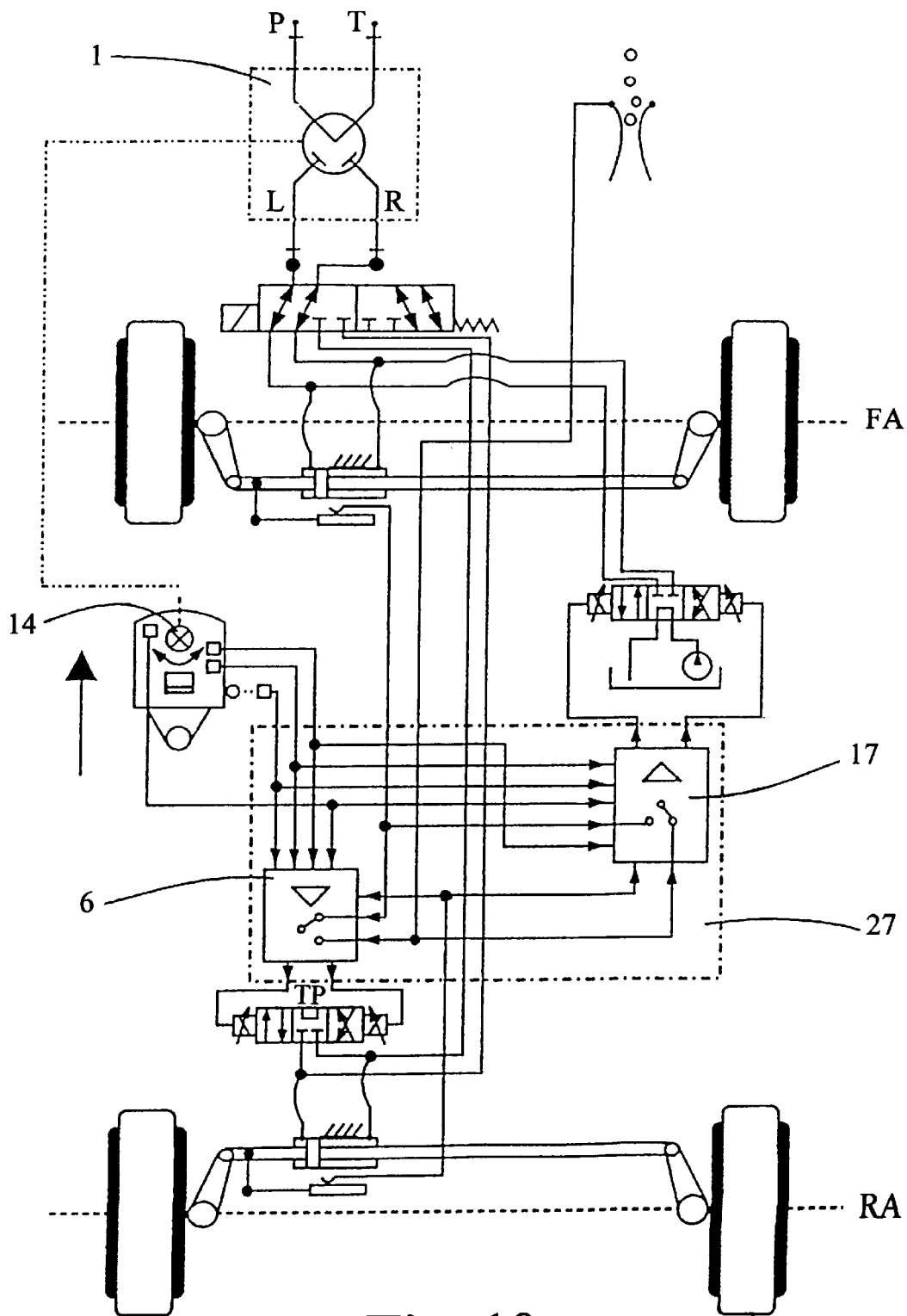
FIGS. 10, 11 and 12 are schematic views showing modifications of the multiple-axle steering system according to the embodiment in FIG. 8.
Figure 11:
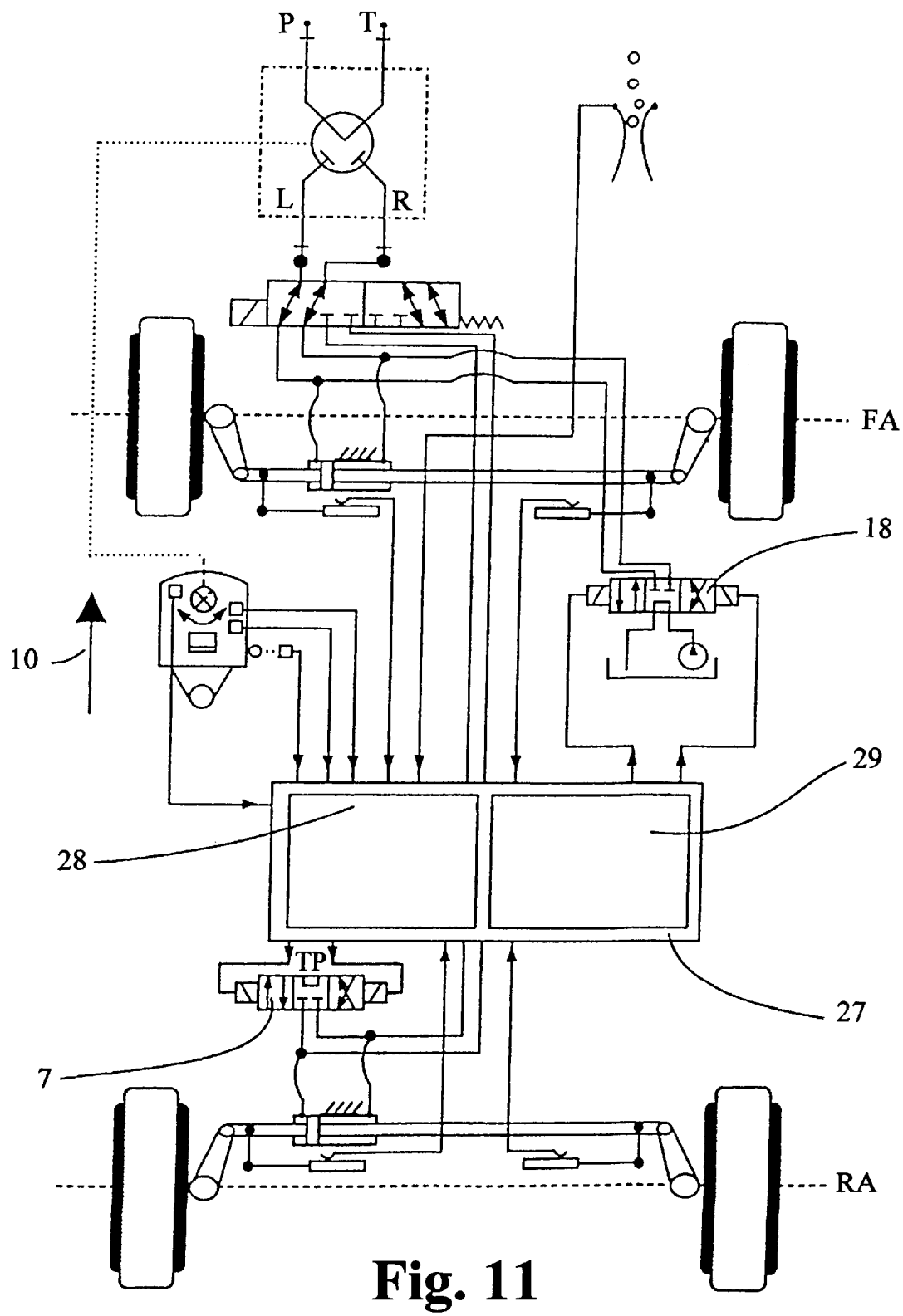

FIG. 10 corresponds to the view of FIG. 8, in which the two steering regulator units $SRU_F$ 17 and $SRU_R$ 6 are integrated in an electronic steering control system 27 shown by phantom lines. Integration in an electronic steering control system 27 is advantageous in that corresponding terminals and signal inputs of the two integrated steering regulator units $SRU_R$ 6 and $SRU_F$ 17 can be reduced in number. Accordingly, it is possible to arrange the signal inputs and outputs of the two steering regulator units $SRU_F$ 17 and $SRU_R$ 6 on the steering control system 27. The logic components of the two steering regulator units can also be implemented as software tasks or arranged in common microprocessor hardware. Integration of the steering regulator units $SRU_F$ 17 and $SRU_R$ 6 in a common microprocessor is shown schematically in FIG. 11. The microprocessor 28 is integrated together with a microcontroller 29 in the electronic steering control system 27. The microcontroller 29 has the function of monitoring the signal inputs and outputs of the microprocessor 28. In addition to enhancing the operation of the machine, the integrated design affords the added advantage of reduced production and maintenance costs. There is also the possibility that the microprocessor 28, working as a microcontroller, can assume the function of the steering regulator unit if there is a malfunction of one of the steering regulator units $SRU_F$ 6 and $SRU_R$ 17. An additional aspect is that the microcontroller 29 can also monitor the solenoid valves $SV_F$ 18 and $SV_R$ 7 and can change them into a currentless state in case of a fault within the multiple-axle steering system. This can take place for instance by means of a common relay (not shown) controlled by the microcontroller 29.

Figure 12:
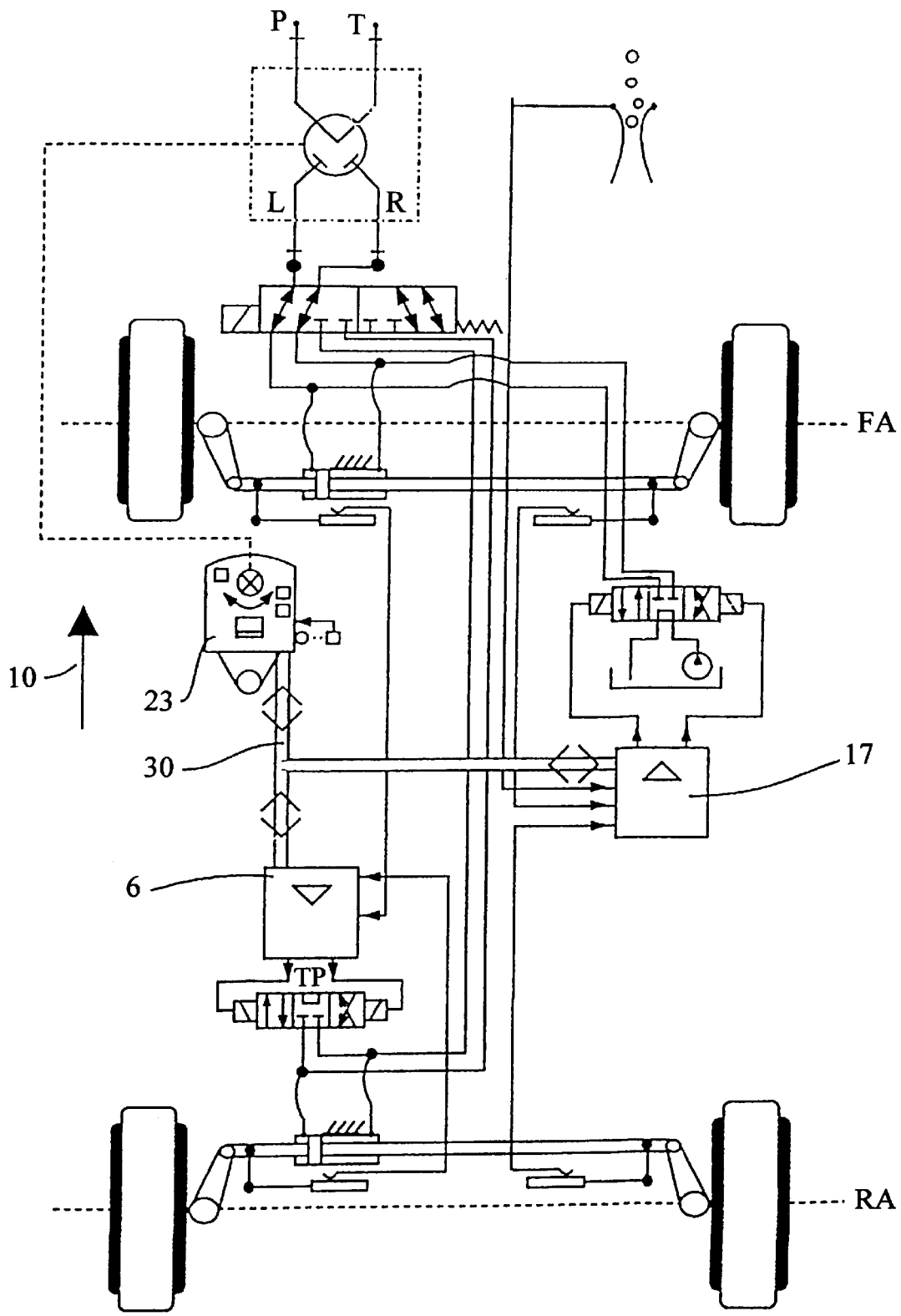

FIG. 12 shows schematically another variant of the multiple-axle steering system, in which the two steering regulator units $SRU_R$ 6 and $SRU_F$ 17 are connected to a bus 30. Due to this construction, the steering regulator units $SRU_R$ 6 and $SRU_F$ 17 can communicate with each other and/or with the bus 30. Thus, wiring costs are minimized and extra data, such as the position of the cab, driving speed or warning messages, can be transmitted.

Combinations of the different variants shown in FIGS. 7–12 are contemplated, bringing a maximum degree of integration with minimized wiring costs.

Furthermore it must be stated that the steering regulator units 6 and 17 can be connected by a communications network to a control and operating console, preferably mounted in the operator's cab 23. Ideally, a serial CAN bus system is to be used as the communications network. It is also advantageous that this bus system 30 can advantageously also be constructed with several redundant systems.

Figure 13:
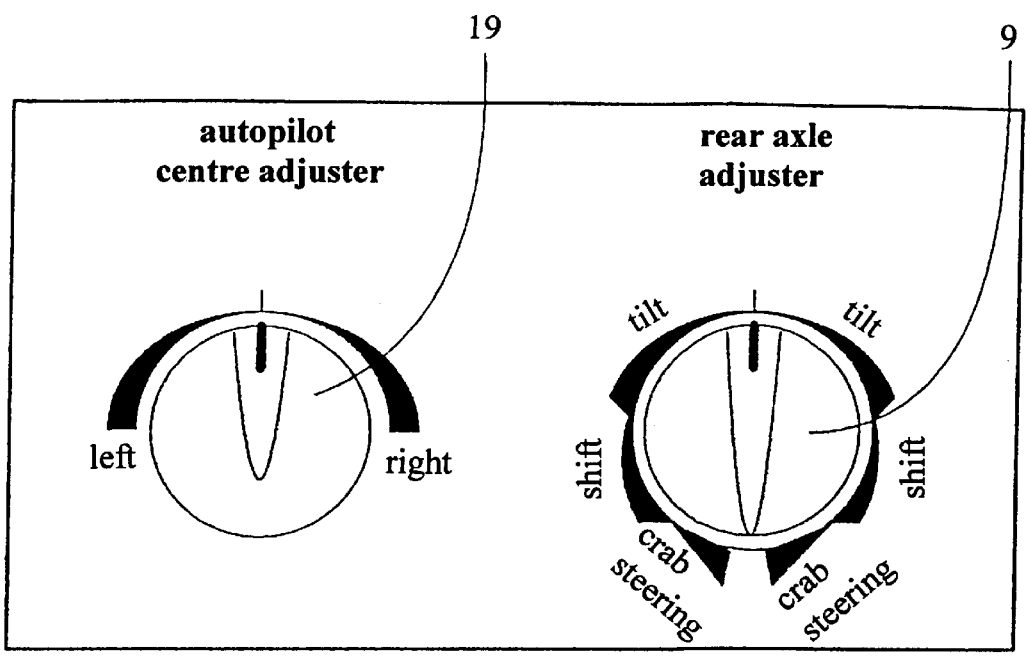
FIG. 13 is a front plan view of an adjusting device for the preselection and variation of different characteristic curves.

An example of an above-mentioned control and operating console is partially shown in FIG. 13. FIG. 13 shows one way, by means of an adjusting potentiometer, of changing characteristic curve RA by only one potentiometer, which in FIG. 13 is referred to as "rear axle adjuster" 9. The rear axle adjuster corresponds to the adjusting device $AD_R$ as shown in FIGS. 7–12 in the driver's cab 23. Naturally a combination with several potentiometers is conceivable, but the example shown in FIG. 13 is particularly advantageous with respect to clarity and space requirements. The adjusting device $AD_R$ 9 has an initial range of rotation about the potentiometer zero position, which is used as the "tilt" range to change the characteristic curve pitch, as was shown in FIGS. 5 and 6. The position of the potentiometer shown in FIG. 13 signifies a pitch of zero of the characteristic curve RA at the origin. Adjoining the "tilt" range is a "shift" range. At the transition from one range to the other, the characteristic curve pitch is automatically reset, and only then can a shift of the characteristic curve from the origin of the characteristic curve take place. Adjoining the second "shift" range in the embodiment shown here is in addition a so-called "crab steering" position. The "crab steering" range involves fixed crab steering which differs from the "shift" range by a larger range of 0–15 degrees, for example.

Switching the multiple-axle steering system on and off is made possible by the rotary potentiometer, which has an extra pulled-out "on" position or a pushed-in "off" position. It is advantageous to arrange stop points between the individual ranges of adjustment. Activation and deactivation of the multiple-axle steering system can be performed only in the position shown for the rotary potentiometer, which can also have a stop point, when the wheels are in the straight-ahead position (no unforeseeable steering reaction).

The adjusting device $AD_F$ for the front axle, which is also shown in FIG. 13 and labelled as "autopilot centre adjuster" 19, is able to carry out a manual correction of the already described autopilot function.

Another advantageous embodiment provides for performing the first "tilt" range of the rear axle adjuster potentiometer by a separate, third "tilt" potentiometer (not shown). In this way combined forms of tilt and shift of the characteristic curves can also be adjusted.

Other objects, features and advantages will be apparent to those skilled in the art. While preferred embodiments of the present invention have been illustrated and described, this has been by way of illustration and the invention should not be limited except as required by the scope of the appended claims.

We claim:

1. A multiple-axle steering system having at least one primary-controlled axle and at least one secondary axle, an apparatus for steering the axles so that the secondary axle's steering deflection angle varies along a progressive characteristic curve as a function of the primary-controlled axle's steering deflection angle, which characteristic curve has a variable pitch at least in a coordinate origin, and a separate adjusting device for shifting the origin of the progressive characteristic curve of the secondary axle relative to the primary controlled axle's steering deflection angle.

2. A multiple-axle steering system according to claim 1, wherein said primary-controlled axle is a front axle, and including a steering unit for controlling the primary-controlled axle.

3. A multiple-axle steering system according to claim 1, wherein the progressive characteristic curve has a slope which varies steadily.

4. A multiple-axle steering system according to claim 1, including an electrohydraulic steering system for controlling the steering deflection angle of the secondary axle.

5. A multiple-axle steering system according to claim 4, wherein said electrohydraulic steering system comprises at least one steering regulator unit and a solenoid valve.

6. Multiple-axle steering system according to claim 5, wherein said steering regulator unit stores at least one characteristic curve of the steering ratio between the primary controlled axle's steering deflection angle and the secondary axle's steering deflection angle.

7. A multiple-axle steering system according to claim 5, wherein the steering regulator unit has a signal input for receiving a control signal correlative to the steering deflection angle of the primary-controlled axle.

8. A multiple-axle steering system according to claim 5, wherein the separate adjusting device is associated with said steering regulator unit.

9. A multiple-axle steering system according to claim 8, wherein said adjusting device comprises at least two ranges of adjustment, the ranges having magnitudes and stop points preferably located at the range boundaries.

10. A multiple-axle steering system according to claim 9, wherein each value of the adjusting device's range of adjustment for the secondary axle's steering regulator unit is assigned a shift of the progressive characteristic curve for the steering angle ratio between the primary-controlled axle and the secondary axle.

11. A multiple-axle steering system according to claim 9, including at least one potentiometer associated with the ranges of adjustment of the adjusting device.

12. A multiple-axle steering system according to claim 1, including an automatic tracking system, and an electrohydraulic steering system associated with the primary-controlled axle for providing a signal input for the control signal of the automatic tracking system.

13. A multiple-axle steering system according to claim 12, wherein said electrohydraulic steering system includes at least one steering regulator unit and a solenoid valve.

14. A multiple-axle steering system according to claim 2, including a solenoid valve associated with the primary-controlled axle for taking a certain quantity of oil from an oil circuit of the steering unit and a front axle steering cylinder unit if there is at least one of: a large shift of the origin of the characteristic curve of the secondary axle, and a high rate of adjustment.

15. A multiple-axle steering system according to claim 14, including means for controlling the quantity of oil taken so that the sum of the resulting steering angle changes of the primary-controlled axle and secondary axle is essentially constant.

16. A multiple-axle steering system according to claim 1, including a solenoid valve for the secondary axle, and wherein a steering unit and the solenoid valve for the secondary axle have a common oil supply.

17. A multiple-axle steering system according to claim 12, including a separate adjusting device associated with said electrohydraulic steering system for controlling an offset for an additional steering angle of the primary-controlled axle.

18. A multiple-axle steering system according to claim 17, wherein said adjusting device is of symmetrical construction and has at least one range of adjustment for the additional steering angle within ±2°.

19. A multiple-axle steering system according to claim 13, wherein there is a steering regulator unit for each steering axle; and wherein each steering regulator unit remains associated with its respective axle upon reversal of the working direction of the machine, and the control of the steering regulator units is reversed according to the reversal of the working direction.

20. A multiple-axle steering system according to claim 13, wherein there is a steering regulator unit for each steering axle; and wherein said steering regulator units and are provided with signal inputs which receive control signals and selectively cause control of the automatic tracking system and of the rear axle steering to be switched.

21. A multiple-axle steering system according to claim 20, wherein said control signal for the automatic tracking system is associated with the primary-controlled axle.

22. A multiple-axle steering system according claim 13, wherein said steering regulator unit includes a monitoring mode which is operative during road driving of the machine.

23. A multiple-axle steering system according to claim 22, wherein said steering regulator unit is associated with the automatic tracking system by means of a transfer function and compares the steering deflection angle of the secondary axle with the steering deflection angle of the primary-controlled axle.

24. A multiple-axle steering system according to claim 23, wherein the steering regulator unit, working in the monitoring mode, generates and displays a fault message if deviations from a nominal value are determined from a comparison of the steering deflection angles.

25. A multiple-axle steering system according to claim 13, wherein said steering regulator unit is integrated into a common electronic steering control system.

26. A multiple-axle steering system according to claim 25, wherein the signal inputs and outputs of the steering regulator unit is arranged on the steering control system.

27. A multiple-axle steering system according to claim 13, wherein the steering regulator unit has a logic component which is implemented as a series of independent software tasks.

28. A multiple-axle steering system according to claim 13, wherein the steering regulator unit has at least one logic component which is implemented by a common microprocessor.

29. A multiple-axle steering system according claim 28, wherein the electronic steering control system includes an extra microprocessor which monitors the signal inputs and outputs of the steering regulator unit.

30. A multiple-axle steering system according to claim 29, wherein the microprocessor, working as a microcontroller, takes over the function of the steering regulator unit in the event of a malfunction of one of the steering regulator units.

31. A multiple-axle steering system according to claim 30, wherein one of the microprocessors changes the solenoid valves to a currentless state in the event of a malfunction of the multiple-axle steering system.

32. A multiple-axle steering system according to claim 13, including a control and operating console, and a communications network connecting the steering regulator unit to the console.

33. A multiple-axle steering system according to claim 32, wherein said communications network is a serial CAN bus system.

34. A multiple-axle steering system according to claim 32, wherein said communications network comprises several redundant bus systems.

35. A multiple-axle steering system according to claim 32, wherein said communications network is operative for signal exchange between all components of the multiple-axle steering system.

36. A multiple-axle steering system according to claim 35, including redundant signal paths for linking said all components of the multiple-axle steering system.

37. A multiple-axle steering system according to claim 1 wherein the progressive characteristic curve has end stops.

38. A multiple-axle steering system according to claim 1 wherein the pitch of the progressive characteristic curve ranges from +1 to −1.

39. A multiple-axle steering system according to claim 1 wherein the pitch of the progressive characteristic curve is −1 at an origin.

40. A multiple-axle steering system according to claim 1 wherein the pitch of the progressive characteristic curve remains constant within a range of angles of rotation of the steering wheel.

41. A multiple-axle steering system according to claim 1 wherein the pitch of the progressive characteristic curve is varied only around the coordinate origin within a range of angles of rotation of the steering wheel.

42. A multiple-axle steering system according to claim 1 wherein the pitch of the progressive characteristic curve is varied from +1 to −1 within a range of angles of rotation of the steering wheel.

43. A multiple-axle steering system for an agricultural machine having at least one primary-controlled axle and at least one secondary axle, an apparatus for steering the axles so that the secondary axle's steering deflection angle varies along a progressive characteristic curve as a function of the primary-controlled axle's steering deflection angle, and means for changing the position of an operator's cab of the machine, and a switching apparatus for reversing a working direction of the machine and for sensing the position of the operator's cab of the machine.

44. A multiple-axle steering system having at least one primary-controlled axle and at least one secondary axle, an apparatus for steering the axles so that the secondary axle's steering deflection angle varies along a progressive characteristic curve as a function of the primary-controlled axle's steering deflection angle which characteristic curve has a variable pitch at least in a coordinate origin, and wherein an additional deflection of the steering wheel, while high deflection in the same direction of front wheels and rear wheels already exists, causes the front wheels to move with an altered steering ratio.

45. A multiple-axle steering system for an agricultural machine having at least one primary-controlled axle and at least one secondary axle, and apparatus for steering the axles so that the secondary axle's steering deflection angle varies along a progressive characteristic curve as a function of the primary-controlled axle's steering deflection angle; an automatic tracking system; an electrohydraulic steering system associated with the primary-controlled axle for providing a signal input for the control signal of the automatic tracking system; a separate adjusting device associated with said electrohydraulic steering system for controlling an offset for an additional steering angle of the primary-controlled axle.

46. A multiple-axle steering system according to claim 45, wherein said adjusting device is of symmetrical construction and has at least one range of adjustment for the additional steering angle within ±2°.

47. A multiple-axle steering system for an agricultural machine having at least one primary-controlled axle and at least one secondary axle, and apparatus for steering the axles so that the secondary axle's steering deflection angle varies along a progressive characteristic curve as a function of the primary-controlled axle's steering deflection angle; each axle having a steering regulator unit; each steering regulator unit remaining associated with its respective axle upon reversal of the working direction of the machine, and the control of the steering regulator units is reversed according to the reversal of the working direction; an automatic tracking system, and an electrohydraulic steering system associated with the primary-controlled axle for providing a signal input for the control signal of the automatic tracking system; said electrohydraulic steering system having at least one steering regulator unit and a solenoid valve.

48. A multiple-axle steering system for an agricultural machine having at least one primary-controlled axle and at least one secondary axle, an apparatus for steering the axles so that the secondary axle's steering deflection angle varies along a progressive characteristic curve as a function of the primary-controlled axle's steering deflection angle; an automatic tracking system; an electrohydraulic steering system associated with the primary-controlled axle for providing a signal input for a control signal of the automatic tracking system; said electrohydraulic steering system having a solenoid valve and a steering regulator unit for each steering axle; said steering regulator units being provided with the signal input which receive the control signal and selectively cause control of the automatic tracking system and of a rear axle steering to be switched.

49. A multiple-axle steering system according to claim 48, wherein said control signal for the automatic tracking system is associated with the primary-controlled axle.

50. A multiple-axle steering system for an agricultural machine having at least one primary-controlled axle and at least one secondary axle, an apparatus for steering the axles so that the secondary axle's steering deflection angle varies along a progressive characteristic curve as a function of the primary-controlled axle's steering deflection angle, a separate adjusting device for shifting the origin of the progressive characteristic curve of the secondary axle relative to the primary controlled axle's steering deflection angle, an automatic tracking system, and an electrohydraulic steering system associated with the primary-controlled axle for providing a signal input for the control signal of the automatic tracking system comprising a steering regulator unit and a solenoid valve, which steering regulator unit includes a monitoring mode which is operative during driving of the machine.

51. A multiple-axle steering system for an agricultural machine including at least one primary-controlled axle and at least one secondary axle, and apparatus for steering the axles so that the secondary axle's steering deflection angle varies along a progressive characteristic curve as a function of the primary-controlled axle's steering deflection angle; an electrohydraulic steering system for controlling the steering deflection angle of the secondary axle, the electrohydraulic steering system having at least one steering regulator unit and a solenoid valve, and said steering regulator unit having a separate adjusting device for shifting the origin of the characteristic curve of the secondary axle relative to the primary controlled axle's steering deflection angle.

52. A multiple-axle steering system according to claim 51, wherein said adjusting device includes at least two ranges of adjustment, the ranges having magnitudes and stop points preferably located at the range boundaries.

53. A multiple-axle steering system according to claim 52, wherein each value of the adjusting device's range of adjustment for the secondary axle's steering regulator unit is assigned a shift of the progressive characteristic curve for the steering angle ratio between the primary-controlled axle and the secondary axle.

54. A multiple-axle steering system according to claim 52, including at least one potentiometer associated with the ranges of adjustment of the adjusting device.

* * * * *